United States Patent [19]

Griffiths

[11] Patent Number: 4,779,767
[45] Date of Patent: Oct. 25, 1988

[54] PRE-MEASURE DISPENSING DEVICE FOR FLUIDS

[76] Inventor: Daniel J. Griffiths, R.D. #1, Box 108A, Centerville, Pa. 16404

[21] Appl. No.: 926,621

[22] Filed: Oct. 24, 1986

[51] Int. Cl.⁴ .............................................. B65D 37/00
[52] U.S. Cl. ..................... 222/205; 222/207; 222/211
[58] Field of Search ............... 222/205, 207, 424.5, 222/500, 158, 490, 442, 206, 211, 212, 464

[56] References Cited

U.S. PATENT DOCUMENTS

| 788,118 | 4/1905 | Perotti | 222/442 X |
| 3,094,250 | 6/1963 | Molyneaux et al. | 222/207 |

FOREIGN PATENT DOCUMENTS

| 3301898 | 7/1984 | Fed. Rep. of Germany | 222/442 |
| 579267 | 7/1958 | Italy | 222/207 |

Primary Examiner—Joseph J. Rolla
Assistant Examiner—Nils E. Pedersen
Attorney, Agent, or Firm—Charles L. Lovercheck; Wayne L. Lovercheck; Dale R. Lovercheck

[57] ABSTRACT

A pre-measure dispensing device is disclosed made of translucent plastic material adapted to be screwed onto the top of a bottle to pre-measure fluid dispensed from said bottle. The bottle may be deformable so that when squeezed, fluid goes up the tube into the measuring device. The bottle can then be tipped to expel the exact amount of the fluid desired.

2 Claims, 1 Drawing Sheet

PRE-MEASURE DISPENSING DEVICE FOR FLUIDS

This is a continuation of application Ser. No. 710,568, filed 3/11/85, now abandoned.

GENERAL DESCRIPTION OF THE INVENTION

The invention is a pre-measure dispensing device to be made of translucent plastic material which may be screwed on top of any existing squeezable bottle and may be used to pre-measure amounts of fluid. To use the device, the cap may be removed. When the bottle is squeezed with the cap in place, fluid is forced up through the tube into the meauring device. The flow of liquid will be stopped when the device is filled. The bottle can then be tipped to expel the premeasured amount of fluid from the cap thereby dispensing no more than the desired amount of fluid. When the bottle is squeezed, fluid is forced through the tube which enters the cap and displaces air which forces fluid out of the dispensing device past ball 21. When the cap is full of fluid, ball 21 floats up and closes the valve.

OBJECTS OF THE INVENTION

It is an object of the invention to provide an improved measuringdispensing device.

Another object of the invention is to provide a dispensing cap with a tube and float for premeasuring fluid.

Another object of the invention is to provide an improved measuring dispensing device that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

REFERENCE TO PRIOR ART

Applicant is aware of the following prior art: U.S. Pat. No. 4,211,346 to Mehra et al; U.S. Pat. No. 4,105,142 to Morris, Jr.; U.S. Pat. No. 3,921,860 to Zackheim; U.S. Pat. No. 3,175,736 to Pelto; U.S. Pat. No. 2,930,238 to Kellett; U.S. Pat. No. 2,714,975 to Greene; U.S. Pat. No. 2,098,160 to Perritt; U.S. Pat. No. 3,608,793 to VanLobenSels and Italian Pat. No. 579,267 to Grassini. cl BRIEF DESCRIPTION OF THE DRAWINGS FIG. 1 is a longitudinal cross sectional view of the dispensing device according to the invention shown supported on a bottle shown in phantom.

DETAILED DESCRIPTION OF THE DRAWINGS

Figures 1, 2, 3:
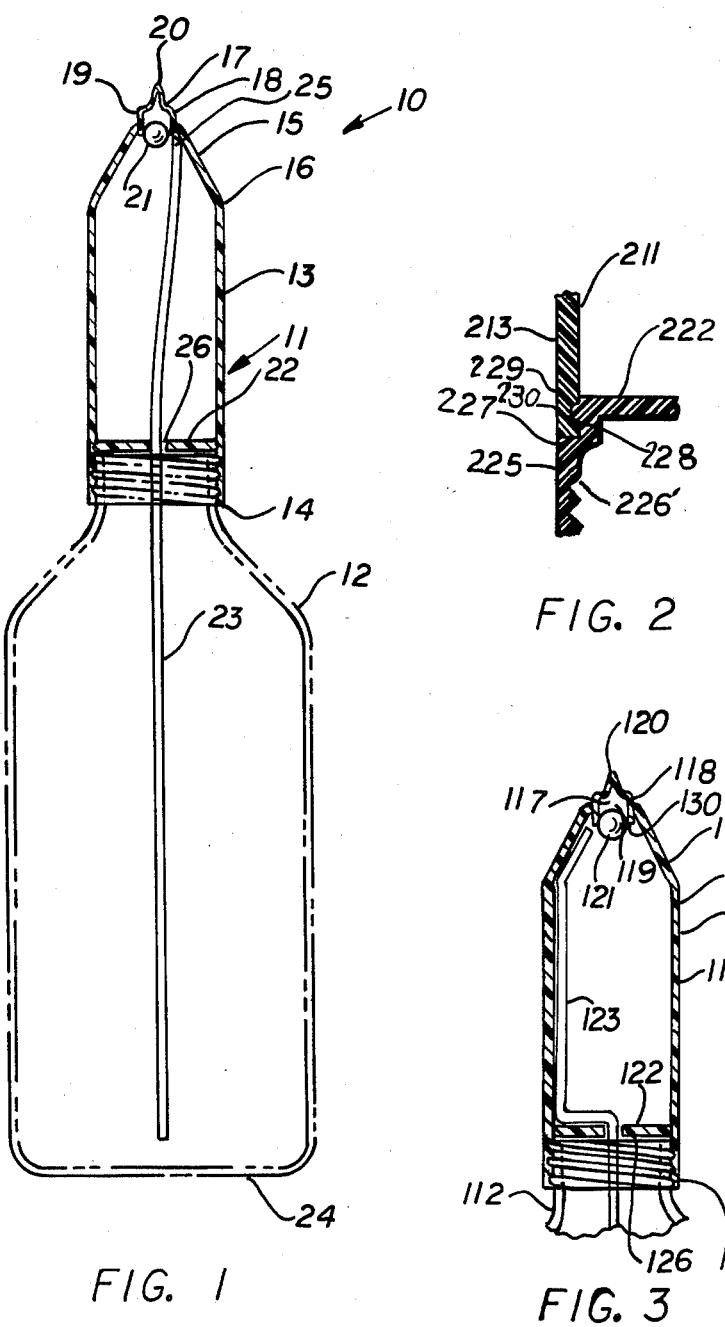
FIG. 2 is an enlarged partial cross sectional view of a joint between the partition and the dispensing device.
FIG. 3 is a longitudinal cross sectional view of another embodiment of the dispensing device.

Now with more particular reference to the drawings which show a combination 10 of pre-measuring dispensing cap 11 of predetermined volume adapted to be supported on a container 12. The cap 11 has a generally cylindrical body 13 having an open end 14 and a generally frustoconical top 15. The frustoconical top part of the cap has a large end 16 and a small end. The large end of the frustoconical top 15 is integrally attached at the large end 16 to the cylindrical body 13. The small end of the frustoconical top has a valve closure 18 attached to it. The valve closure member has a recess 19 and a discharge opening 20. A valve closure 21 in the form of a floatable ball is adapted to be received in the recess 19. The valve closure member 21 floats up against valve seat 17 adjacent the recess 19 when liquid rising to the upper level and fills the cap. The recess 19 is surrounded by a valve seat 17 between the discharge opening 20 and the top 15. A partition 22 adjacent the open end 14 of the cylindrical body 13 is provided.

A tube 23 extends through opening 26 of the partition 22 into the container 12 to a position adjacent the bottom 24 of the container. The upper end of tube 23 terminates at its upper most part at end 25 adjacent the valve seat 17. The valve closure 21 which is in the form of a floatable ball is adapted to move past the side of the upper end of the tube 23 to engage the valve seat 17 as fluid level rises in the cap.

Now with more specific reference to the embodiment of the invention shown in FIG. 2, I show a measuring and dispensing cap 211 adapted to be supported on a container and having internal threads 226' to engage the threaded open end of a squeezable bottle or the like.

Hollow cylindricl base 225 has internal threads 226' and may have partition 222 integrally attached to it. A reduced size cylindrical part 228 receives the part 229 of in the body 213. The lower end of the body 213 rests against the shoulder 227. A beam 230 is formed on the outside of the reduced size portion 28. The bead 230 is received in an internal groove in the body 213. The combination of body 213 and end 225 can be molded in separate two parts for ease of molding and the body 213 can be cemented to the base 225. The cap 211 has a cylindrical body 213 and an open end with a generally frustoconical top like the embodiment of FIG. 1.

In the embodiment of FIG. 3, the tube 123 extends through the central part of partition 122 then laterally along the top of partition 122 then upwardly along the inside of body 113, then upwardly along the inside wall of top 116 and terminates adjacent valve 118. Thus, tube 123 does not obstruct the central part of the cap.

When the user squeezes the walls of the container, air from the cap is dispensed through the opening 120 and further squeezing drives liquid up through the tube 123 and fills the body 113 to the predetermined amount. When the liquid reaches the top of the body 113 the floating valve closure member 121 will float up into the recess and against the valve seat 117 stopping the flow of liquid. When the container 112 is brought to inverted position, the floating valve closure member 121 will fall, allowing the valve closure to move from seat 117 so that the liquid can be discharged.

To use the dispensing measuring device disclosed herein, the container is filled and the cap is threaded onto the upper end of a container 112 by means of the internal threads 114 in the body of the dispensing device. To dispense the liquid, the bottle is squeezed which will force the fluid up through the tube 123 into the recess 130 of the dispensing device. As the cap 111 fills it will cause the floating valve closure member 121 to flow up to the position shown in FIG. 1 and into sealing engagement with the valve seat 17 and stop the flow of the fluid into the cap. The bottle 112 can then be set upright and the fluid from the bottle will be trapped in the cap 13. The user can then invert the container and squeeze the fluid out through the opening 20.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a measuringdispensing cap and a squeezable container having a bottom comprising, a cap and a squeezable container, said cap being supported on said container, said cap having a generally cylindrical body having an open lower end attached to said container and extending upwardly therefrom, a generally frustoconical top, said frustoconical top having a large end and a small end, said large end of said frustoconical top being integrally attached to said cylindrical body, said small end terminating in a valve closure, said valve closure comprising a hollow cylindrical member attached to said small end of said frustoconical top and extending upwardly therefrom and terminating in an inwardly directed shoulder, and extending downwardly therefrom a substantial distance into said cap, a conical valve member having an apex and a base attached to said shoulder, a discharge opening in the said apex of said conical valve member, a floatable generally spherical valve closure member having a diameter substantially equal to the inside diameter of said hollow cylindrical member and adapted to be received in said hollow cylindrical member, said shoulder forming a valve seat surrounding said base of said conical member, a partition adjacent said open end of said cylindrical body of said cap, a tube, said tube in said container extending through said partition into said container to a position adjacent said bottom thereof and terminating at the upper end of said cylindrical body closely adjacent said valve closure member and at one side thereof whereby fluid emitted from said from said tube when said bottle is squeezed is diverted from said discharge opening by said downwardly extending hollow cylindrical member, said valve closure being adapted to move past said upper end of said tube into said valve cylindrical member to engage said shoulder and prevent the flow of fluid from said tube into said cap when said cylindrical body is filled.

2. The cap recited in claim 1 wherein said tube extends through said partition then extends along the inside of said body and along the inside of said frustoconical top.

* * * * *